United States Patent [19]

Canterino et al.

[11] Patent Number: 4,464,815
[45] Date of Patent: Aug. 14, 1984

[54] MULTIDIRECTIONAL ORIENTATION APPARATUS

[75] Inventors: Peter J. Canterino, Towaco; Craig E. Allen, Clark, both of N.J.

[73] Assignee: Mobil Oil Corporation, New York, N.Y.

[21] Appl. No.: 398,531

[22] Filed: Jul. 15, 1982

Related U.S. Application Data

[62] Division of Ser. No. 221,712, Dec. 31, 1980, Pat. No. 4,374,690.

[51] Int. Cl.³ .......................... D06C 3/06; B29D 7/14
[52] U.S. Cl. ........................................... 26/72; 26/105
[58] Field of Search .......................... 425/66, 363, 369; 264/290.2; 26/72, 105

[56] References Cited

U.S. PATENT DOCUMENTS

| | | | |
|---|---|---|---|
| 1,347,714 | 7/1920 | Rowley | 26/105 |
| 3,032,829 | 5/1962 | Mahoney et al. | 26/105 |
| 3,048,895 | 8/1962 | Bottomley | 264/290.2 X |
| 3,268,142 | 8/1966 | Macomson | 26/72 |
| 3,545,054 | 12/1970 | Sands et al. | 26/105 |
| 4,153,664 | 5/1979 | Sabee | 264/282 |
| 4,223,063 | 9/1980 | Sabee | 28/100 |
| 4,368,565 | 1/1983 | Schwarz | 264/290.2 X |

*Primary Examiner*—James B. Lowe
*Attorney, Agent, or Firm*—A. J. McKillop; M. G. Gilman; Frank J. Kowalski

[57] ABSTRACT

Apparatus for orienting a mailable film comprising means for pulling the film through at least one pair of multi-directional orientation rollers having helical grooves thereby imparting a random multi-directional orientation to the film.

8 Claims, 3 Drawing Figures

MULTIDIRECTIONAL ORIENTATION APPARATUS

This is a division of application Ser. No. 221,712 now U.S. Pat. No. 4,374,690 filed Dec. 31, 1980.

BACKGROUND OF THE INVENTION

1. Field of the Invention

The present invention relates generally to a novel process and apparatus for the strengthening of film and, more particularly, pertains to a process and apparatus for the multidirectional orientation of film to improve the overall stiffness and tear resistance therein.

The inventive arrangement effectively provides a novel process and apparatus for the continuous multidirectional orientation of film which improves the overall stiffness and tear resistance thereof. By laminating a multidirectional oriented film to a similarly produced film, a laminated film having vastly improved qualities is formed.

2. Discussion of the Prior Art

The present state of the art related to the strengthening of films or laminates has developed techniques for uniaxially or biaxially orienting films to improve overall strength, stiffness and tear resistance. It is well known in the prior art that by stretching a film in one direction, this uniaxially orients the molecules of the film in the direction of stretch. By doing so, improved tear resistance and stiffness properties result in the direction transverse to the axis of stretching. Similarly, biaxial orientation can be accomplished in numerous ways. Particularly, a film can be simultaneously stretched along two axes thereby providing improved stiffness and strength in two distinct directions. Another method of providing a biaxially oriented laminated sheet is by uniaxially stretching one sheet and laminating it to a oppositely oriented uniaxial sheet. This provides a composite biaxial oriented film. Still, another way to biaxially orient a sheet is to uniaxially orientate the film, slit the film along a bias, and then laminate the film in such a manner as to have the orientation of one ply be oppositely disposed to the orientation of the second ply.

As is also well known in the prior art, numerous problems are encountered in seeking to achieve a laminate with improved overall stiffness and tear resistance. Although a uniaxial ply improves tear resistance transverse to the direction of stretching, tearing is easily effectuated along the longitudinal axis of stretching. Biaxial orientation improves stiffness and tear resistance in two directions, but the laminate is still highly susceptible to tears which run longitudinally along the combination of the axes. Further, the biaxial orientation methods used are not easily adaptable to one-line usage consequently making the prior art biaxial methods highly time consuming and very expensive.

The present invention, however, effectively alleviates the aforementioned problems related to the orientation of the molecules within the film. None of the prior art arrangements directed to solving these problems do so as completely and effectively as the present invention. None of the prior art, of which Haley U.S. Pat. No. 4,101,625; Takahasi U.S. Pat. No. 3,746,608; Kim et al. U.S. Pat. No. 4,101,358; Rasmussen U.S. Pat. No. 4,039,364 and Schwarz U.S. Pat. No. 4,223,059 are typical, show or even suggest the process and apparatus as described herein.

As is illustrated in Haley U.S. Pat. No. 4,101,625 the invention therein discloses a method for making molecularly oriented plastic strapping having improved physical properties which include increased resistance to longitudinal splitting and increased longitudinal stiffness. Haley provides a band formed of essentially non-oriented thermoplastic material having a rectangular cross-section which is of a corrugated configuration and is expanded in the band width direction so as to orient polymer molecules in the transverse direction after which the band is elongated to orient the polymer molecules in the longitudinal direction. The band of thermoplastic polymeric material is formed with an essentially flat, rectangular cross-section and is then compressed between a pair of cooperating corrugated rollers and is then expanded laterally so that the transverse section of the band has a corrugated configuration and the transverse orientation of the band of polymer molecules are achieved simultaneously. The produced longitudinally corrugated band is then stretched longitudinally to provide longitudinal orientation of the molecules within the band. Unlike the present invention, this patent teaches the use of corrugation bands intermittently within the film to supply increased stiffness and tear resistance coupled with a simultaneous stretching procedure. The present invention has nothing to do with corrugating film, but rather solely deals with orienting the molecular structure within the film in a relatively random fashion thereby increasing tear resistance in all directions.

Takahashi U.S. Pat. No. 3,746,608 discloses an elongated strapping band having high tensile strength and improved resistance to longitudinal splitting wherein the band is formed of polypropylene which has been longitudinally oriented and laminated to outer layers wherein such layers have been biaxially oriented by applying a transverse force sufficient to permanently change the initial uniaxial orientation to biaxial orientation. Finally, mechanically made indentations are pressed into the film to further distort the biaxial orientation of the molecules. This reference is highly indicative of the prior art in that it shows the mere combination of biaxial and uniaxial orientations to provide an improved film. The present invention is a clear departure of the art because of the randomness of the orientation which is imparted to the molecules of the film without resort to indentations or the like.

In Kim et al. U.S. Pat. No. 4,101,358 there is disclosed a method of making non-woven fabric by laminating sheets of parallel continuous main ribs interconnected by webs of reduced thickness extending therebetween and oriented at different angles thereto. This produces a structure reinforced by the differently-oriented ribs of the laminated layers. This mechanical deformation of the film to produce increased strength is highly complicated and is not considered pertinent to the present invention, yet is included to show the state of the art.

Rasmussen U.S. Pat. No. 4,039,364 shows merely the combination of uniaxial and biaxial plies in a criss-cross fashion to increase strength and resistance to tearing. By combining extruded laminates which have been stretched in alternating directions, a patchwork of orientation is achieved in a multi-ply laminate. This patent is highly complicated and does not lend itself to efficient, relatively inexpensive on-line operation as does the present application.

Finally, Schwarz U.S. Pat. No. 4,223,059 is provided to show the uniaxial stretching of fibers to gain increased strength in webbing. This invention is not concerned with the tearing of a film in a transverse direction to the stretching axis.

The present invention, unlike the prior art, provides a relatively simple and inexpensive process and apparatus to multi-directionally orient the films which are to be laminated. Orienting the molecular structure in a random fashion results in increased stiffness and tear resistance. Further, there being no lengthy axes of orientation, there are no axes along which tears can propagate. Consequently, the film produced by the process and apparatus described herein is greatly improved over the prior art and discloses a relatively simple and inexpensive solution to the afore-mentioned problems.

SUMMARY OF THE INVENTION

Accordingly, it is a primary objective of the present invention to provide a novel process and apparatus for multi-directionally orienting the molecular structure within a polymer film.

Another object of the present invention is to provide a process and apparatus for multi-directionally orienting a polymer film in an on-line, continuous fashion.

A further object of the present invention is to impart to the film a random orientation to the molecular structure thereby providing improved tear resistance and stiffness.

Still another object of the present invention is to provide films which can be laminated together, irrespective of the orientation of each film, thereby greatly decreasing the cost and time required for lamination.

The present invention provides a novel process and apparatus for multi-directionally orienting the molecular structure of polymer film by utilizing grooved rollers which impart a random orientation to the molecular structure of the film as the film is pulled through the cooperating rollers.

BRIEF DESCRIPTION OF THE DRAWINGS

The foregoing and other objects, advantages and characterizing features of the inventive process and apparatus herein described will become more readily apparent from the following detailed description of a preferred embodiment thereof, taken in conjunction with the accompanying drawings wherein like reference numerals denote similar parts throughout the various views and in which.

DESCRIPTION OF THE PREFERRED EMBODIMENTS

Figure 1:
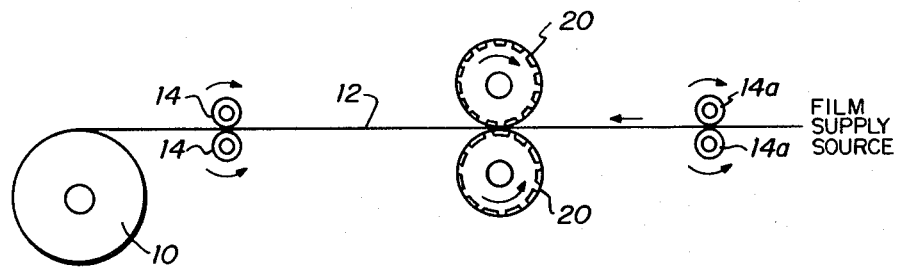
FIG. 1 is a schematic side sectional view of the apparatus described herein.

Drive and support assemblies, timing and safety circuits and the like, known and used by those skilled in the art, have been omitted in the interest of clarity.

Referring now in detail to the drawings, the present invention contemplates the use of any polymer to form a film 12 and, in particular, copolymers of polyethylene. The film 12 can either be blown, cast or extruded, the details of the actual formation of the film, well known to those skilled in the art, is outside the scope of the present invention and not included herein. Low density polyethylene, as described below, is used as the preferred film 12.

Orientation is a process whereby a plastic film or sheet is stretched in such a way as to orient the polymeric chains of the plastic film parallel to the plane of the film but more or less randomly within this plane. Biaxial, or planar orientation occurs when a film or sheet is drawn in more than one direction, in the prior art this is commonly done along two axes at right angles to one another. The tensile strength and elastic modulus are increased in the directions of pull and decreased in the direction perpendicular to the plane of the film. Uniaxial orientation, or stretching in only one direction, is normally employed in the prior art for the formation of filaments and the stretching occurs during the drawing operation. The polymer chains are aligned in a single dimension, as in a sheaf. This uniaxial orientation produces maximum strength in one direction, i.e., the direction of orientation. It has been commonly found, however, that a uniaxially oriented sheet of film material will tend to crack and split along lines parallel to the direction of stretching. Also, while stretching a film of crystalline or partially crystalline polymeric material in one direction will generally improved the properties in the direction, it has been found that these same properties, e.g. strength, clarity, etc., will normally deteriorate in the direction at right angles to the direction of stretch.

The polyethylene films which can be used in the present invention are low density polyethylene (LDPE) films or sheets produced by well-known film-forming techniques—e.g. extrusion or casting–from readily available polymer resins. Such resins may be conventional ethylene homopolymers or copolymers of ethylene with other unsaturated monomers. Preferred unsaturated monomers for copolymerization with ethylene comprise acrylic acid, esters of acrylic acid, vinyl acetates or other vinyl esters, and olefinic monomers having from 3 to about 8 carbon atoms. It should be understood that the present invention is directed to films which can include any polymer which can be formed into a sheet-like structure. The specific types of polymers detailed above are for the purpose of providing a detailed description and should not be taken, in any way, to limit this invention. Although low density polyethylene is the preferred film to be used, this selection should not be considered to limit the present disclosure, but is done by way of illustration.

The film 12 is pulled from the film supply source, such as the output of a film casting source, by nips 14a and is further pulled by the nips 14 through the multi-directional orientation rollers 20. The rollers 20 are provided with thread 22 and grooves 24. The film 12 is pulled through and in between the rollers 20. The film 12 travels through the gap between the face 26 of the intermeshing thread 22 and the foot 28 of the grooves 24. The intermeshing of the thread 22 with the grooves 24 imparts a random orientation to the molecular structure within the film 12. As graphically shown in FIG. 3, the path of orientation varies sinusoidally as the film 12 passes through the rollers 20. The random orientation of the film is directly related to the roll diameter and the helical angle, the angle between the axis of the groove 24 and the axis of the roller 20. Typically, the preferred embodiment uses a helical angle of approximately 30° and a roll diameter of approximately 6 inches. The helical angle can, however, be widely variable and the optimum value should be experimentally determined for each particular polymer.

Figure 2:
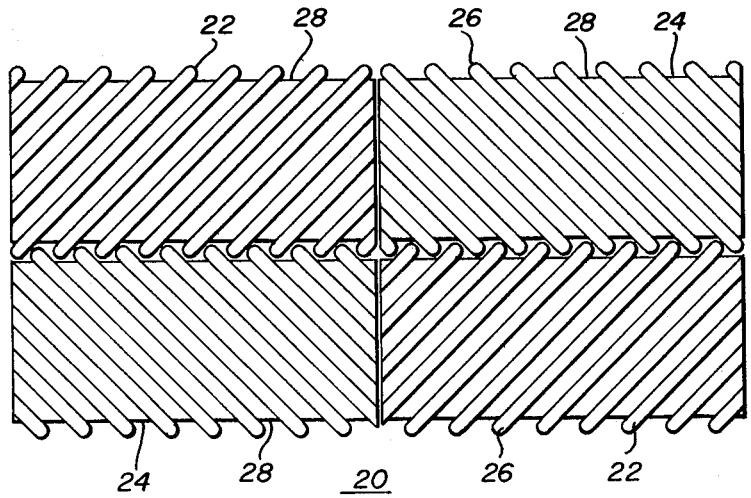
FIG. 2 is a side sectional view of a configuration of the cooperating multi-directional orientation rollers.

In FIG. 2 there is shown the optimum number of rollers 20. Two pares are utilized to prevent the lateral sliding of the film 12 which may occur if only one pair of rollers 20 is used. Particularly, because one pair of rollers 20 imparts a combined force because of the interaction of the threads 22 in a single direction, the film 12 can be forced laterally out from between the rollers. This problem can be corrected by using adequate film guides (not shown) to prevent the lateral slippage of the film 12.

Figure 3:
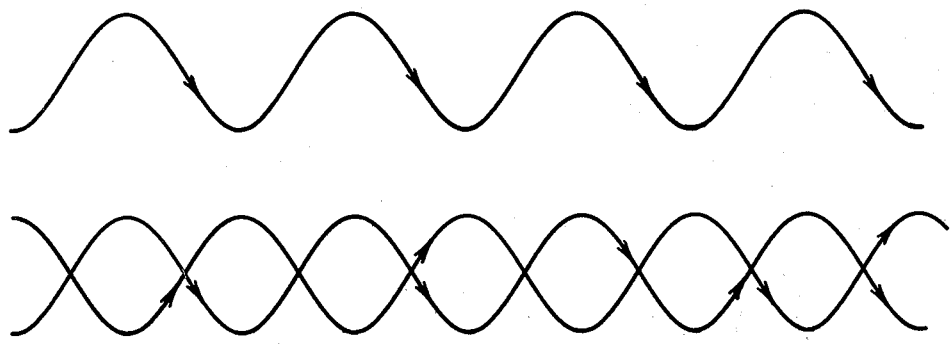
FIG. 3 is a graphical representation of the orientation of the polymer's molecules imparted by the cooperating rolls.

To provide an extremely strong laminate which can be used, for example, as shopping bags, which inherently require a high degree of stiffness, the film produced from the above described apparatus can be laminated to another, similarly prepared film. As shown in FIG. 3, the combination of two randomly oriented films provides an extremely tear resistant and stiff laminate.

Numerous methods can be used to provide adequate lamination of these films. Heat combined with pressure is a well known type of lamination and although the most inexpensive, has been found to be least desirable herein. Rather, coating the films with chemical adhesives produces the best lamination results. Typically, the films are treated with Corona discharge, a well known adhesive enhancer, prior to treatment with adhesives. The chemical adhesives which have been found to be successful are: Natural Starch 33-4501; H. B. Fuller V-503; and Paisley Products 1380-6 Adhesive, all well known to those skilled in the art.

In operation, nips 14a guide the film 12 to a takeup roll 10 and help guide the film 12 through the multi-directional orientation rolls 20. The film 12 is pulled between and through the intermeshing threads 24 and grooves 28 by nips 14. The intermeshing rollers 20 thereby impart a random multi-directionally orientation to the molecular structure within the film 12. This procedure thereby imparts increased strength and stiffness to the film 12. The film 12, so produced, can be laminated to a similarly produced film thereby creating a greatly strengthened laminate film.

From the foregoing, it is apparent that the objects of the present invention have been fully accomplished. As a result of the present invention, a novel process and apparatus for multi-directionally orienting film has been provided. Although a preferred embodiment of the principles of this invention has been described and illustrated in detail herein, it should be realized that the same are not limited to the particular configuration shown in the drawings, and that modifications thereof are contemplated and can be made without departing from the broad spirit and scope of this invention as defined in the appended claims.

I claim:

1. An apparatus for multi-directionally orienting the molecular structure within a malleable film comprising:
    a. at least one pair of oppositely disposed orientation rollers having angularly threaded helical grooves along the entire length of said rollers, said grooves of each roller having generally arcuate edges being configured to provide continuously alternating orientation directions and positioned to receive the threads of said oppositely disposed roller;
    b. nips which pull said film through said multi-directional orientation rollers.

2. An apparatus as defined in claim 1, wherein said rollers have equal helical angles.

3. An apparatus as defined in claim 2, wherein said helical angles are oppositely disposed thereby allowing the thread of one roller to be received by the groove of the other said roller.

4. An apparatus as defined in claim 2, wherein said helical angle is from about 90° to about 0°.

5. An apparatus as defined in claim 4, wherein said helical angle is 30°.

6. An apparatus as defined in claim 1 or 2, wherein said rollers have a space between the face of the thread of one roller and the foot of the receiving groove of the other roller.

7. An apparatus as defined in claim 1, wherein said film consists of any polymer capable of forming a film.

8. An apparatus as defined in claim 1 or 7, wherein said film comprises a polymer of low density polyethylene.

* * * * *